United States Patent [19]

Francis

[11] 4,103,589

[45] Aug. 1, 1978

[54] MULTIPLE SPINDLE DIVIDING HEAD

[75] Inventor: Walter C. Francis, Newport News, Va.

[73] Assignee: Trans-ACC, Inc., Cincinnati, Ohio

[21] Appl. No.: 723,242

[22] Filed: Sep. 15, 1976

[51] Int. Cl.² .................. B23B 31/30; B23Q 17/04
[52] U.S. Cl. ........................... 90/56 R; 279/4; 279/5; 408/71
[58] Field of Search ............... 90/56 R; 279/4, 5; 408/45, 71; 269/63

[56] References Cited

U.S. PATENT DOCUMENTS

| 552,185 | 12/1895 | Kellogg | 279/51 |
| 1,001,419 | 8/1911 | Mastrangel | 279/5 |
| 1,477,178 | 12/1923 | La Ducer | 90/56 R |
| 2,504,186 | 4/1950 | De Munck | 279/4 |
| 3,087,736 | 4/1963 | Lukas | 279/4 |

Primary Examiner—Othell M. Simpson
Assistant Examiner—Z. R. Bilinsky
Attorney, Agent, or Firm—Melville, Strasser, Foster & Hoffman

[57] ABSTRACT

A multiple spindle dividing head in which each spindle is driven in synchronism from a common drive shaft adapted to be driven from a single source of power which may be pneumatic, hydraulic or electrical, the spindles being moved automatically from an open to a closed work-piece engaging position by pneumatic or hydraulically actuated means which maintain the spindles in the closed position as they are rotated and yet permit the spindles to be readily opened in any rotative position to release the work-pieces engaged thereby.

6 Claims, 4 Drawing Figures

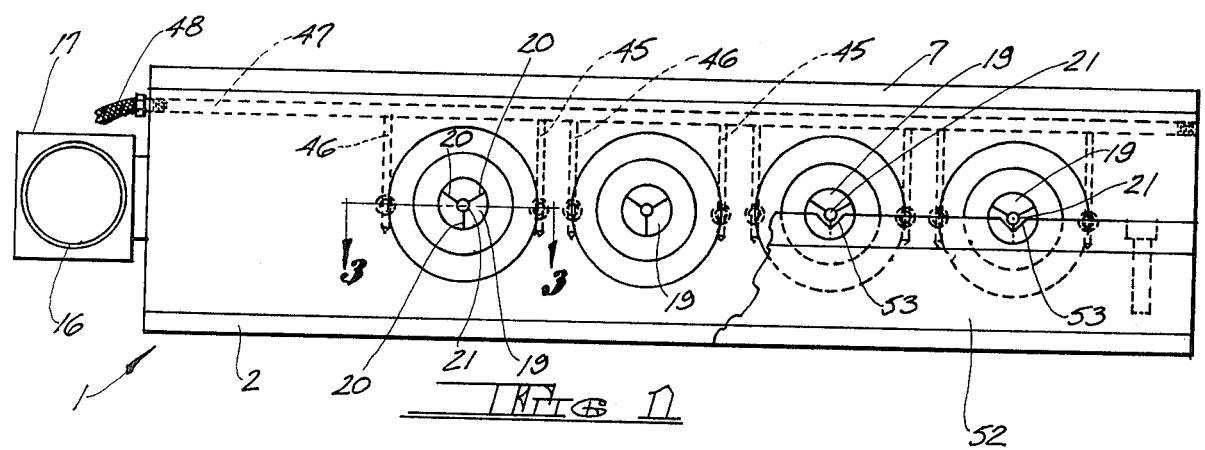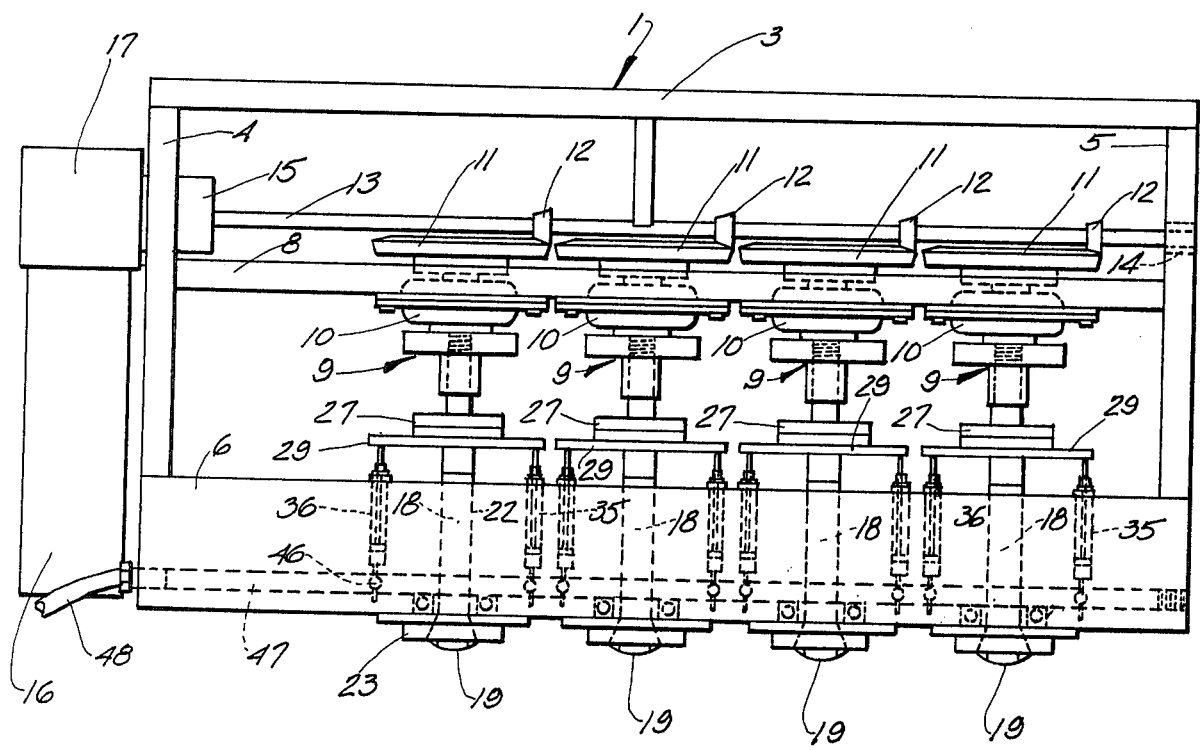

MULTIPLE SPINDLE DIVIDING HEAD

BACKGROUND OF THE INVENTION

The present invention relates to dividing or indexing heads by means of which a work-piece may be indexed or rotated by predetermined equal amounts so that various milling, drilling, shaping or planing operations may be performed on the work-piece. In particular, the present invention is directed to a multiple spindle dividing head by means of which a plurality of work-pieces may be acted upon simultaneously.

Dividing heads have been in use for many years and generally comprise a work-piece engaging chuck or collet which is mounted to be either manually or mechanically rotated to achieve the desired indexing of the work-piece. Most of the chucks or collets must be manually operated to engage and release the work-piece. While it has hitherto been proposed to provide chucking devices having multiple spindles, and to utilize hydraulic means to cause a collet to grip a work-piece, the prior art devices have been of complex and expensive construction, and are difficult to service and maintain in proper adjustment.

SUMMARY OF THE INVENTION

In accordance with the present invention, any desired number of spindles may be mounted in either horizontal or vertical alignment in a supporting housing to provide a self-contained operating unit which may be readily mounted on a fixed base or on a swivel base or other adjustable support by means of which the spindles may be accurately positioned relative to a bank of cutting tools, drills or the like, which will act upon the work-pieces engaged by the spindles.

The spindles are adapted to be rotated in unison by means of a common drive shaft connected through a suitable clutch to a shaft rotating actuator which may comprise an pneumatic or hydraulic actuator, or an electronic stepping motor, the actuator being chosen in accordance with available sources of power. Many plants are equipped with hydraulic and/or pneumatic systems which may be utilized to supply fluid pressure both for the actuator and for the collet locking means, each spindle having a split ring collet at its leading end projecting from the housing.

The collets are axially movable relative to the spindles from an open or work-piece receiving position to a closed or work-piece engaging position by means of sets of hydraulic or pneumatic pistons which act against face plates by means of which the collets are displaced into gripping engagement with the work-pieces, the face plates serving to maintain the collets in tight gripping engagement with the work-pieces until pressure on the sets of pistons is relieved, whereupon the collets will be returned to their open position.

The mechanism of the present invention is of simple construction and it is easy to adjust and repair, and yet is rugged and accurate in operation.

DESCRIPTION OF THE DRAWINGS

FIG. 1 is a side elevational view of a multiple spindle dividing head in accordance with the invention, with certain parts broken away and others in dotted line.

FIG. 2 is a plan view of the device with the cover removed and with certain parts shown in dotted lines.

DESCRIPTION OF THE PREFERRED EMBODIMENT

Figure 3:
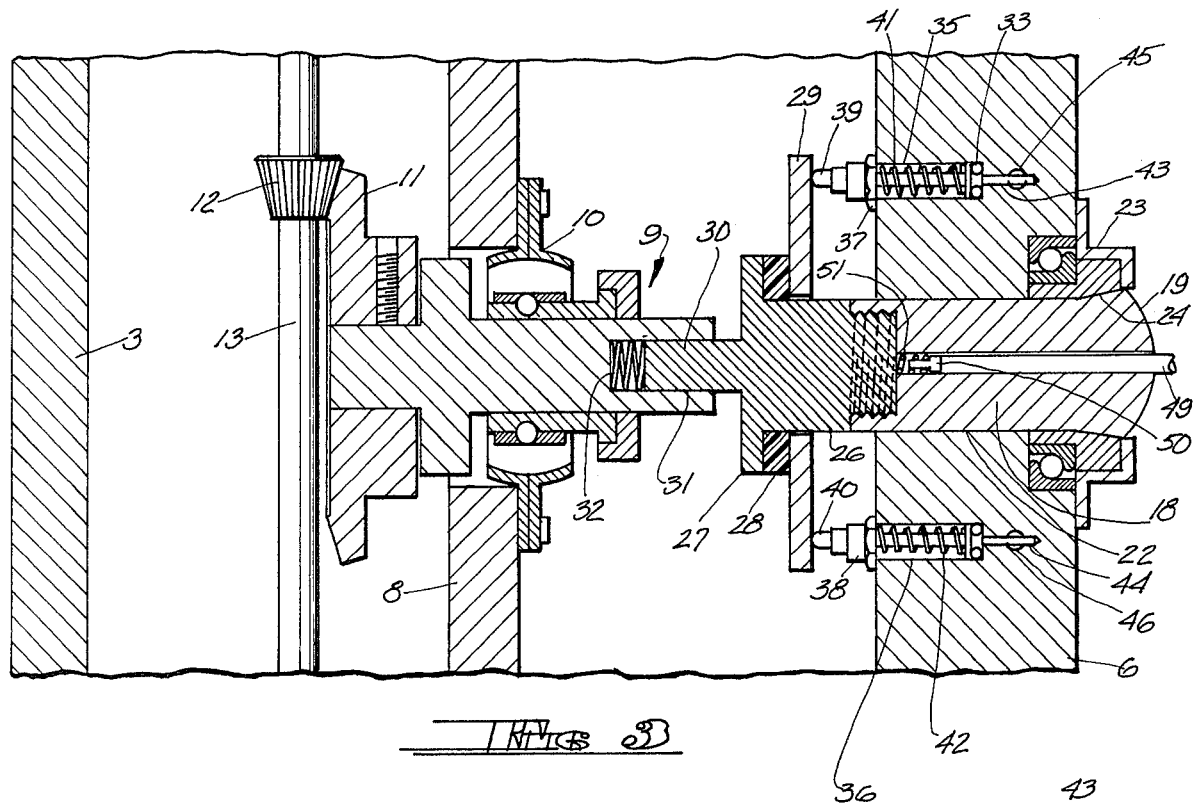
FIG. 3 is an enlarged horizontal sectional view taken along the line 3—3 of FIG. 1 illustrating the spindle with the collet in the open or work-piece receiving position.

FIGS. 1 and 2 illustrate a dividing head having four spindles, although it will be understood that the number of spindles may be varied as required. The spindles are mounted in a rectangular housing, indicated generally at 1, the housing preferably being of box-like construction fabricated from steel plate and having a bottom 2 mounting a rear wall 3, opposing end walls 4 and 5, and an enlarged front wall 6, together with a removable cover 7 by means of which access may be readily had to the interior of the housing. A spindle supporting wall 8 extends lengthwise of the housing intermediate the front and rear walls to which the spindles, indicated generally at 9, are rotatably mounted by means of bearing assemblies 10.

Each of the spindles 9 mounts a bevel driving gear 11 engaged by a bevel gear 12 mounted on a drive shaft 13 extending lengthwise of the housing in parallel relation to supporting wall 8, the drive shaft being journaled at one end in bushing 14 mounted in end wall 5 and at its opposite end in an over-run clutch 15 mounted on end wall 4.

The drive shaft 13 is rotated by an actuator 16, which may comprise a rotary cylinder of known construction, which rotates shaft 13 through over-run clutch 15 to which the actuator 16 is operatively connected through translation coupling 17. As previously indicated, the actuator 16 may be pneumatically or hydraulically controlled, or it may comprise an electronic stepping motor, the function of the actuator being to index the spindles through the desired degree of rotation each time the actuator is energized. For example, if it is desired to rotate the spindles through an angle of 90°, the actuator, if it comprises a rotary cylinder, will be adjusted to rotate the drive shafts 13 through the required number of revolutions to effect a 90° rotation of each spindle. The actuator may be manually actuated or it may be operated by a timing device or limit switches, depending upon the nature of the operation being performed and the equipment by which it is performed.

Each of the spindles mounts a collet 18 having a tapered head 19 and three equally spaced slots 20 (FIG. 1) which split the head into sections, together with a central work-piece receiving opening 21. The collets extend through horizontal bores 22 in enlarged front wall 6 and have their tapered heads 19 rotatably journaled in bearing collars 23 surrounding the outermost ends of bores 22, the bearing collars 23 having tapered shoulders 24 (FIGS. 3 and 4) adapted to bear against the tapered heads of the collets.

Figure 4:
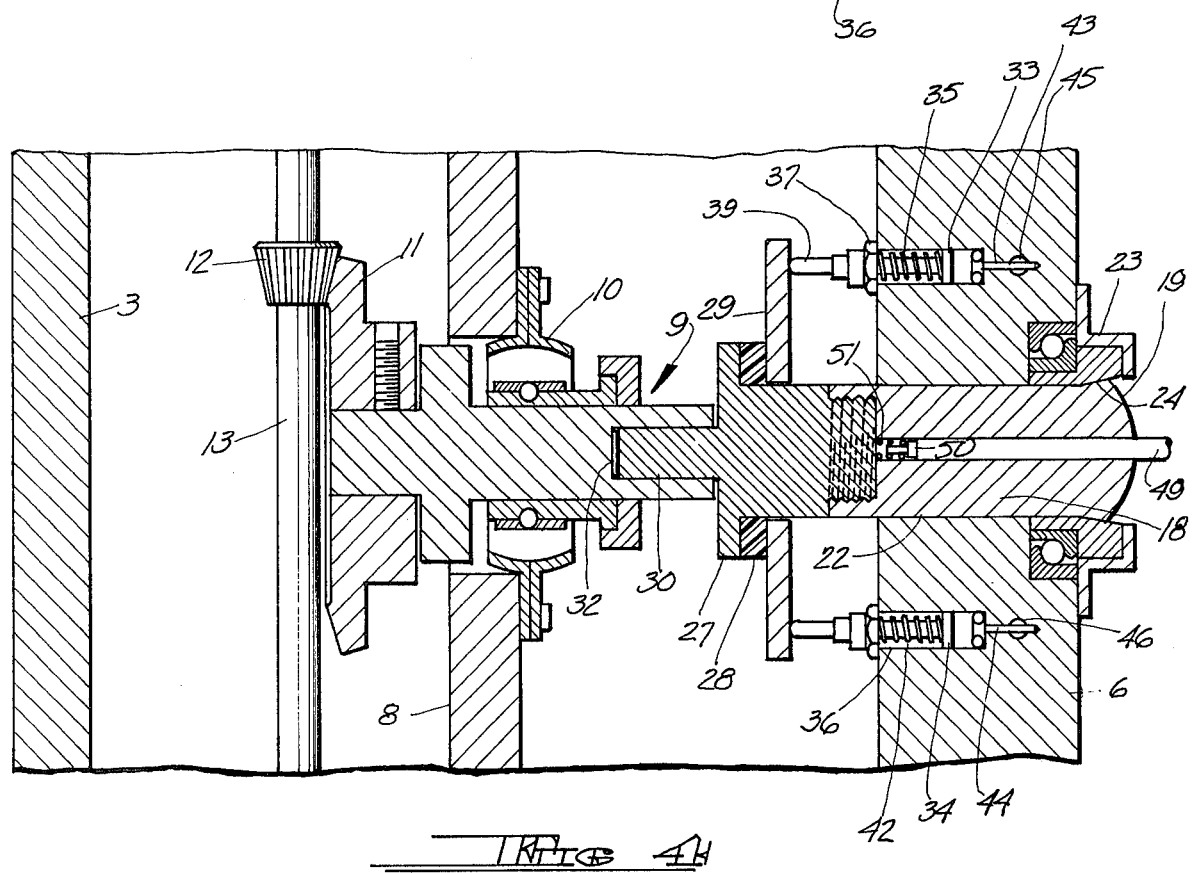
FIG. 4 is a vertical sectional view similar to FIG. 3 but illustrating the collet in the closed or workpiece engaging position.

As also seen in FIGS. 3 and 4, a fitting 26 is threaded to the opposite end of collet 18, the fitting having an annular shoulder 27 against which a thrust bearing 28 is seated, the thrust bearing, which may be plastic, providing a seat for the annular face plate 29 which surrounds and is rotatable on fitting 26. Fitting 26 also mounts a rearwardly projecting shaft 30, preferably of rectangular configuration, which is slidably received in a mating socket 31 in spindle 9, a coil spring 32 being seated in socket 31 in abutting engagement with the end of shaft 30. The collet 18 is thus operatively connected to spindle 9 and will rotate therewith, the collet additionally being displaceable axially relative to the spindle.

Axial displacement of the collet is accomplished by a pair of pistons 33 and 34 fitted in cylinder-forming annular bores 35 and 36, respectively, formed in front wall 6 on opposite sides of collet 18, the bores being closed at their outermost ends by fittings 37 and 38 through which piston rods 39 and 40 project, the ends of the piston rods contacting face plate 29 adjacent its opposite side edges. Coil springs 41 and 42 surround the piston rods 39 and 40, respectively, and extend between the pistons at one end and the fittings at the opposite end, the springs normally biasing the pistons to a retracted position. Fluid under pressure is adapted to be introduced into the ends of the cylinder-forming bores 35 and 36 through branch passages 43 and 44 bored in the front wall 6 in prolongation of the cylinder forming bores, the passages 43 and 44 interconnecting with vertical passages 45 and 46, respectively, which, as seen in FIGS. 1 and 2, connect with main supply passage 47 which extends lengthwise through front wall 6 and is connected to a source of supply, represented by the conduit 48. Thus, fluid under pressure introduced into main supply line 47 will flow through the sets of vertical passageways 45, 46 and the branch passageways 43, 44 to displace the pistons 33, 34 outwardly against the compression of springs 35, 36, the piston rods 39, 40 thus bearing against and displacing face plate 29 rearwardly relative to front wall 6.

FIG. 4 illustrates the collet assembly in the rearwardly displaced position in which it will be seen that the tapered head 19 of the collet has traveled inwardly along the tapered shoulders 24, thereby radially compressing the head of the collet inwardly so as to contract the opening 21 and hence exert tight gripping engagement on the work-piece 49 inserted in the opening 21. Axial displacement of the collet also serves to displace the shaft 30 inwardly in socket 31 against the tension of spring 32; and the parts will be maintained in the displaced position until the fluid pressure on pistons 33 and 34 is released. When the fluid pressure is released, the springs 35 and 36 will displace the pistons to their fully retracted position and the piston rods 39 and 40 will retract, thereby freeing the face plate 29 and the collet 18 for outward movement relative to front wall 6 under the influence of compressed spring 32, the parts thereby returning to the position illustrated in FIG. 3 in which the sections of the collet will be free to expand radially outwardly to the open position.

It is preferred to provide a plunger 50 in the work-piece receiving opening 21 in the collet, the plunger being biased in the direction of the work-piece by a spring member 51. With this arrangement, when a work-piece is positioned in each collet, a pusher bar or similar arrangement may be employed to uniformly position the outermost end edges of the work-pieces even though their over-all lengths may vary slightly due to manufacturing tolerances. If desired, and as illustrated in FIG. 1, a work-piece guide 52 may be mounted in front of the collets 18, the guide having V-grooves 53 which will accurately align the work-pieces with the openings 21 in the collets.

As should now be evident, in the operation of the device, the work-pieces will be inserted, either manually or automatically, into the collets and seated against the plungers 50 in desired alignment. Thereafter, fluid under pressure will be introduced through conduit 48 to actuate the sets of pistons 33, 34 which act through face plates 29 to displace the collets rearwardly, thereby forcing the collets into gripping engagement with the work-pieces. Suitable valve means or other controls will be provided to introduce the fluid under pressure into the system; and such control means may be manually actuated or automatically actuated in conjunction with the feeding and positioning of the work-pieces. Once the work-pieces have been engaged, an initial operation may be performed on them or they may be rotated to a desired starting position. As previously described, the acutator 16 will be actuated to effect the desired indexing movement of the collets, the spindles 9 acting to rotate the collets through interconnecting shafts 30, the spindles rotating in their bearings 10 and the collets in their bearing assemblies 23. By reason of the face plates 29, which bear against thrust bearing 28, the collets are maintained in their axially displaced work-piece engaging position irrespective of the rotational position of the collets. As should also be evident, the construction is quite simple, yet efficient, and readily lends itself to production manufacture. For example, the various bores and fluid passageways may be readily formed in front wall 6 by straight-line drilling and tapping operations, as may be the mounting of the spindles to the supporting wall 8 using readily available bearing assemblies. With the removable cover, all parts of the device are readily accessible for adjustment, repair or replacement.

Modifications may be made in the invention without departing from its spirit and purpose; a number of such modifications have already been set forth and others will undoubtedly occur to the skilled worker in the art upon reading this specification. For example, while in the embodiment illustrated the work-pieces are inserted into the collets from the front of the device, they could also be inserted from the rear in an automatic feeding operation of known character, the fitting 26, shaft 30 and spindle 9 being axially bored in alignment with opening 21 in the collet. Thus, a continuous length of work-piece stock could be fed through rear wall 3 for incremental projection from the collets. Accordingly, it is not intended that the scope of the invention be limited other than in the manner set forth in the claims which follow.

The embodiments of the invention in which an exclusive property or privilege is claimed are described as follows:

1. A multiple spindle dividing head comprising a housing, a plurality of spindles rotatably mounted in said housing, a common drive shaft in said housing, gear means operatively connecting said spindles to said drive shaft, actuator means operatively connected to said drive shaft for rotating said spindles, split ring collets having work-piece receiving openings therein operatively connected to said spindles for rotation therewith, means mounting said collets for axial movement relative to said spindles, said collets having tapered heads at their forward ends projecting through openings in said housing, bearing collars mounted on said housing and surrounding the heads of said collets, said bearing collars having tapered surfaces engaging the tapered heads of said collets, face plates surrounding said collets, said face plates being operatively connected to said collets to displace them axially rearwardly, pairs of fluid cylinders on opposite sides of each of said collets extending in parallel relation thereto, said cylinders containing rearwardly projecting piston rods positioned to contact said face plates upon movement from a retracted to an extended position, and means for supplying fluid under pressure to said cylinders to displace said piston rods rearwardly, whereby the tapered heads of the collets are radially contracted by the tapered surfaces of said bearing collars as said collets are displaced from a forward work-piece receiving position to a rearward work-piece clamping position by the piston rods as they bear against said face places, said face plates permitting said collets to rotate while maintained in their work-piece engaging position.

2. The dividing head claimed in claim 1 wherein said collets are in axial alignment with said spindles, and wherein the means mounting said collets for axial movement relative to said spindles comprises shafts projecting rearwardly from said collets and sockets in said spindles positioned to slidably but non-rotatively receive said shafts.

3. The dividing head claimed in claim 2 including means biasing said collets to their forward position.

4. The dividing head claimed in claim 3 wherein the means biasing said collets to their forward position comprise springs in said sockets extending between said shafts and the inner ends of said sockets.

5. The dividing head claimed in claim 4 including spring means in said cylinders to bias said piston rods to their retracted position.

6. The dividing head claimed in claim 5 wherein said housing has a thick wall through which the collet receiving openings extend, wherein said fluid cylinders are defined by bores in said thick wall, and wherein the means for supplying fluid under pressure to said cylinders comprise passageways formed in said thick walls.

* * * * *